May 1, 1934.  R. BECK  1,957,037
PRESSURE INDICATING DEVICE
Filed Oct. 19, 1932  2 Sheets-Sheet 1
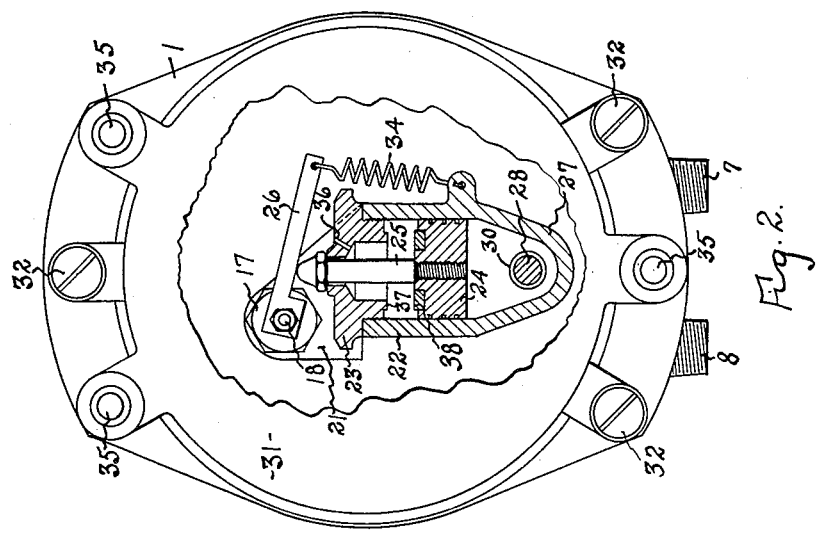
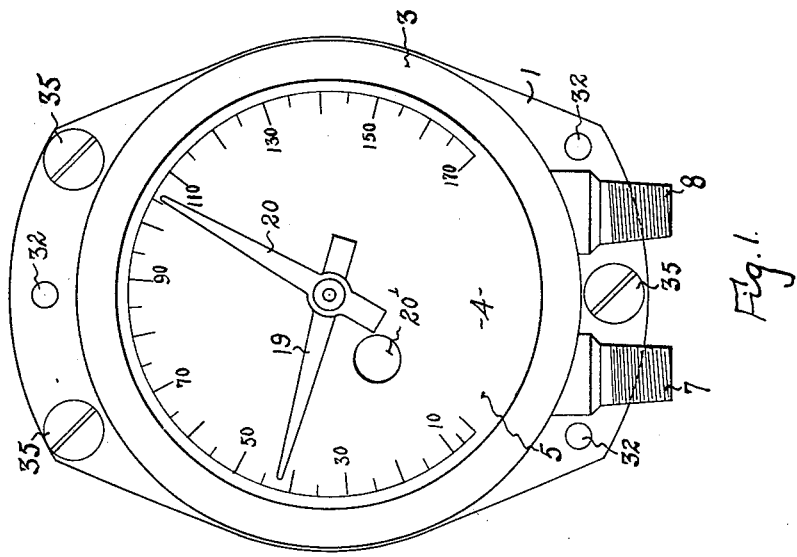
INVENTOR
*Rudolf Beck*
BY *Darby & Darby*
ATTORNEYS.

May 1, 1934.   R. BECK   1,957,037
PRESSURE INDICATING DEVICE
Filed Oct. 19, 1932   2 Sheets-Sheet 2
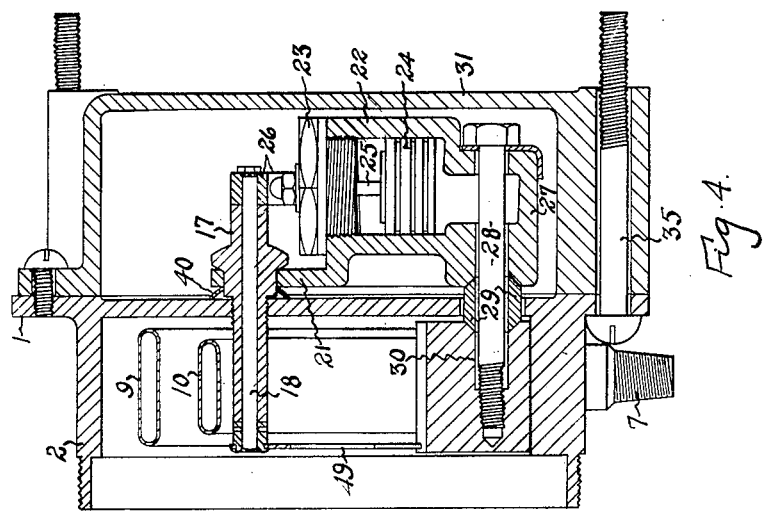
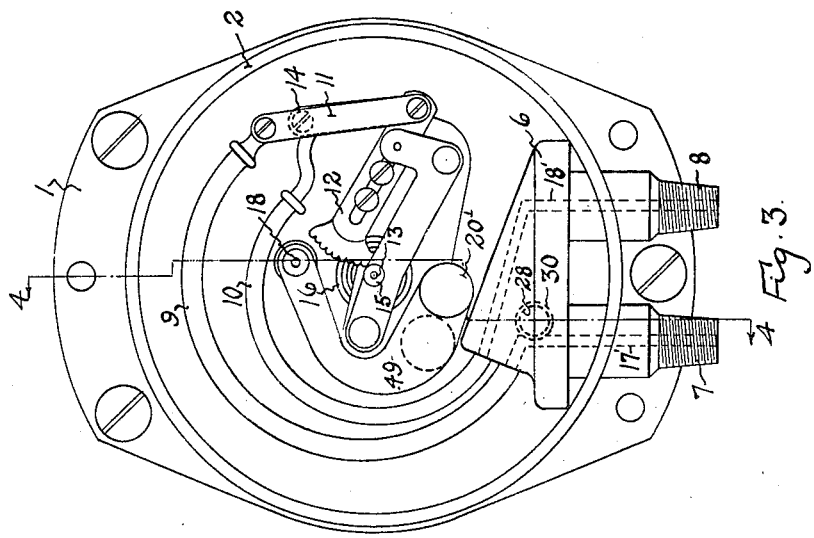
INVENTOR
Rudolf Beck.
BY Darby & Darby
ATTORNEYS.

Patented May 1, 1934

1,957,037

UNITED STATES PATENT OFFICE 1,957,037

PRESSURE INDICATING DEVICE

Rudolf Beck, Bridgeport, Conn., assignor to Consolidated Ashcroft Hancock Company, Inc., Bridgeport, Conn., a corporation of Delaware Application October 19, 1932, Serial No. 638,543

6 Claims. (Cl. 73—109)

This is an invention in pressure gauges for indicating fluid pressures, and particularly for simultaneously indicating different pressure conditions in several parts of a fluid pressure system.

One of the objects of this invention is to provide, in combination with a single or multiple indicating pressure gauge, an additional minimum pressure indicating device which will visibly indicate pressure conditions to which the single or multiple indicating device is insensitive.

A further object of this invention is to provide a device having the above functions in a simplified commercial form with regard to structure.

These and many other objects as will appear from the following disclosure are secured by means of this invention.

This invention resides substantially in the combination, construction, arrangement, and relative location of parts, all as will appear from the following disclosure.

Referring to the drawings—

Figure 1 is a front elevational view of the device of this invention;

Fig. 2 is a rear elevational view with a portion of the rear cover broken away;

Fig. 3 is a front elevational view of the device with the cover, dial and indicating hands removed;

Fig. 4 is a vertical cross-sectional view taken on the line 4—4 of Fig. 3.

In fluid brake systems such as those employed on power driven vehicles, of which trains, street cars, buses and the like are examples, it is usual to employ a fluid pressure gauge which not only indicates the pressure at the fluid pressure source or storage tank, but also indicates the pressure in the brake line and brake cylinders when the brakes are applied. The pressures employed in such systems are of such an order that the pressure indicating gauge is not sensitive to relatively low pressures such, for example, as those of the order of one or two pound gauge. Being thus insensitive to these relatively low pressures, the indicating portion of the gauge connected to the brake line and brake cylinders is not sensitive, and hence does not accurately indicate the presence of such relatively low pressures in the brake line and brake cylinders. If, as is sometimes the case in the operation of such vehicles, the brake valve should leak when the brakes are released so that a condition of relatively low pressure does exist in the brake line and brake cylinders, the vehicle operator is unaware of this condition because of the insensitiveness of his gauge thereto. This condition of low pressure is undesirable because it is of sufficient force to cause the brake cylinders to apply the brake shoes with a light pressure to the brake drums to generate an undesirable amount of heat and to cause unnecessary wear of the brake shoes and drums. The desired condition is, of course, that when the brake valve is shut off and the brakes are released the pressure in the brake line and cylinders is atmospheric.

A general object of this invention is to provide in a simple and commercial structure a gauge which will not only indicate the pressure at the source and the pressure in the brake line and cylinders, when the brakes are applied, but which will also indicate relatively low pressures in the brake lines and brake cylinders when the brakes are released and to which pressures the indicating mechanism in the brake line is insensitive.

Referring to the drawings, the device will now be described in detail.

While the invention is, as shown, described in connection with a duplex gauge, it is, of course, in no sense limited thereto in use, but may be employed with a simplex gauge, or one which indicates more than two pressure conditions. The gauge comprises a base plate 1 on which is formed a casing or housing 2, closed by means of a removable ring 3 which supports a glass window 4 to seal the casing. Visible through the window is the dial 5 suitably calibrated.

Within the casing is a terminal block or support 6 to which is secured the hollow threaded nipples 7 and 8. Supported from this block are the Bourdon tubes 9 and 10 of the usual construction. Nipple 7 is connected to tube 9 by passage 17', and nipple 8 is connected to tube 10 by passage 18'. The free ends of these tubes are connected by means of the linkage mechanism 11, 12 and 14 to effect operation of the shafts 13 and 15 which rotatably support the indicating hands 19 and 20. The linkage mechanism includes toothed racks which engage with small gears on the spindles 13 and 15 to effect rotation thereof.

A spring, or springs, such as 16 acts to normally hold the indicating hands at zero condition on the dial scale. This portion of the mechanism is only thus briefly referred to because it is known in detail in a number of forms and by itself forms no part of this invention.

At 17 is a hollow thimble which threadedly engages the rear wall of the casing and provides a journal support for an oscillatable shaft 18. The forward end of this shaft is provided with an indicating arm 49, the free end 20' of which is suitably colored—preferably red. As shown in Fig. 1, the dial is provided with an opening through which the arm 49 is observable. As indicated by the dotted circle in Fig. 3, when the arm 49 is in normal position the uncolored portion of the arm is visible therethrough.

A cylinder casing 22 is provided with an extension 21 which is locked to the back of the casing 1 by means of the hollow thimble 17, as is clear from Fig. 4. A spring washer 40 serves to firmly lock the parts in position. The lower end 27 of this casing is provided with a passage therethrough, in which lies a bolt 28 which engages the block 6 and locks the parts in position, as shown. The passage 30 within which the bolt 28 lies is larger than the external diameter of the bolt and is continuous from the space of cylinder 22 into the block 6. A bushing 29 completes the passage and forms a seal between the block 6 and the extension 27.

It will be noted from Fig. 3 that passage 17' intersects passage 30. Within the cylinder 22 is a piston 24 provided with a piston rod 25 which slidably passes through the plug 23, which seals the upper end of the cylinder. Secured to the rear end of shaft 18 for rotation therewith is a lever 26 positioned to engage the protruding end of the piston rod 25. A spring 34 anchored on the casing 22 connects with the free end of arm 26. A port 36 is provided in the plug 23, so that the space above the piston will not be air bound. The lower end of plug 23 is provided with an annular seat 37 positioned to engage a sealing ring 38 on the upper face of the piston. When fluid pressure is applied to the lower face of the piston it may move freely upwardly because of the vent 36. Since the piston must be fairly free in the cylinder so as to be sensitive to the relatively low pressures to be indicated, there will be some leakage past it, especially at higher pressures, such as is encountered when the brakes are applied. To prevent leakage of this air the sealing ring 38 is provided so as to rest on the annular seat 37 when the piston is in its upper position. This thoroughly seals the cylinder against leakage under these conditions. A suitable casing 31 is secured to the rear wall of casing 2 by means of the machine screws 32 to enclose all the parts mounted on the back of the casing. The bolts 35 are provided to secure the gauge in any suitable location.

When the device is in use a pipe connects the nipple 8 directly to the fluid pressure source, so that the Bourdon tube 10 and the parts connected thereto will move the indicating hand 20 to the proper position on the scale. This hand continuously indicates the pressure of the source. A pipe connects the nipple 7 to the brake line beyond the brake valve. When this valve is in "off" position so that the brakes are released, there should be no pressure in the brake lines and brake cylinders. At this time hand 19 is at zero and arm 49 is in a position so that the uncolored portion thereof is observable through the opening in the dial. However, if there should be a low pressure condition in the brake line and cylinders, such as would occur from leakage of the brake valves, that pressure will be present in passage 17', the Bourdon tube 9, passage 30 and the space in cylinder 22 below the piston. This pressure is too low to cause the Bourdon tube to distort sufficiently to cause indicating hand 19 to indicate it. However, this pressure is sufficient to cause piston 24 to move upwardly, so that this piston rod 25 will cause lever 26 and shaft 18 to move counter-clockwise (Fig. 2) and tension spring 34. Arm 49 (Fig. 1) will be moved with the shaft 18, so that its colored end 20' will become visible through the opening in the dial. This immediately indicates to the vehicle operator the undesirable condition of greater than atmospheric pressure in the brake lines and cylinders. Steps may then be taken to correct this condition. It will, of course, be apparent that when the brakes are applied, arm 49 will be moved to expose its colored end. This is immaterial, however, since the vehicle operator will be familiar with this operating condition. Indication by arm 49 at this time is of no consequence.

At this time also, of course, indicating arm 19 will be indicating on the dial the pressure in the brake line and cylinders. It is likewise at this time that ring 38 seals the cylinder by pressing against the annular seat 37 to prevent leakage of the air at these higher pressures. As soon as the brakes are released and assuming there is no pressure in the brake line and cylinders, spring 34 will pull arm 26 downwardly and return piston 24 and piston rod 25 to normal position (Fig. 2), so that the colored end 20' of arm 49 is not visible through the opening in the dial. This indicates correct operating conditions. The portion of the arm 49 visible through the opening in the dial is preferably of the same color as the dial, so that the contrast of the colored end of this arm when exposed through the opening will be immediately apparent.

From the above description it will be apparent that this invention may be embodied in other physical forms without departure therefrom, and I do not, therefore, desire to be strictly limited to the disclosure as given for purposes of illustration but rather to the scope of the appended claims.

What I seek to secure by United States Letters Patent is:

1. A gauge as described, comprising a casing, a dial therein, an indicating hand movable over the face of the dial, Bourdon spring pressure responsive means for moving said hand, an indicating arm oscillatably mounted on the casing, a low pressure responsive means for oscillating said arm, said low pressure means being responsive to pressure to which any Bourdon spring is inherently insensitive and means forming an interconnecting passage between both of said pressure responsive means.

2. A gauge as described, comprising a casing, a dial therein having an opening, an indicating hand movable over the face of the dial, pressure responsive means for moving said hand, a cylinder mounted on the back of said casing, a journal mounted on the casing and securing the cylinder thereto, a shaft oscillatably mounted in said journal, an arm mounted on said shaft and observable through the opening in the dial, a piston in said cylinder having a piston rod projecting exteriorly thereof, an operating arm on said shaft engageable by said piston rod, and means forming a passage interconnecting said pressure responsive means and said cylinder.

3. A gauge as described, comprising a casing, a dial therein having an opening, an indicating hand movable over the face of the dial, pressure responsive means for moving said hand, a cylinder mounted on the back of said casing, a journal mounted on the casing and securing the cylinder thereto, a shaft oscillatably mounted in said journal, an arm mounted on said shaft and observable through the opening in the dial, a piston in said cylinder having a piston rod projecting exteriorly thereof, an operating arm on said shaft engageable by said piston rod, a spring for resisting movement of said piston rod, and means forming a passage interconnecting said pressure responsive means and said cylinder.

4. A gauge as described, comprising a casing, a dial therein, an indicating hand movable over the face of the dial, pressure responsive means for moving said hand, an indicating arm, a closed cylinder mounted on the casing, a piston slidable in the cylinder, a piston rod connected thereto and projecting exteriorly of the cylinder, means interconnecting the indicating arm and the piston rod to effect operation of the indicating arm by the piston rod, the end wall of the cylinder adjacent the piston rod having a vent passage, means forming a passage between the pressure responsive means and the cylinder, and means mounted on the piston and cooperating with the seat on the end wall of the cylinder for sealing the cylinder against leakage through the vent.

5. A gauge as described, comprising a casing, a dial therein, an indicating hand movable over the face of the dial, pressure responsive means connected to said hand for moving it, an open ended cylinder mounted on said casing, a cap for closing said cylinder and having a passage therethrough, means for connecting the opposite end of the cylinder with said pressure responsive means, a piston loosely fitting in said cylinder, an indicating vane connected to said piston, and means on the upper face of said piston for sealing said passage when the piston is forced against the cap to expose the vane.

6. In combination a Bourdon gauge for indicating relatively high fluid pressures and inherently insensitive to low pressures, a cylinder mounted on said gauge, an apertured plug closing the end of the cylinder, means forming a passage for connecting the cylinder with said gauge, an indicating member movable by said piston and a sealing member on one face of said piston for engaging said plug and sealing the aperture therein to prevent the escape of fluid pressure past the piston, said piston fitting loosely in said cylinder.

RUDOLF BECK.